(12) United States Patent
Degorce-Dumas et al.

(10) Patent No.: US 12,176,788 B2
(45) Date of Patent: Dec. 24, 2024

(54) MOTOR SUPPORT FOR A HEATING, VENTILATION AND/OR AIR-CONDITIONING DEVICE FOR A MOTOR VEHICLE

(71) Applicant: Valeo Systemes Thermiques, Le Mesnil Saint-Denis (FR)

(72) Inventors: Clara Degorce-Dumas, Le Mesnil Saint Denis (FR); Clémence Kwaczewski, Le Mesnil Saint-Denis (FR); Stéphane De Souza, Le Mesnil Saint-Denis (FR); Vincent Guilbot, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 350 days.

(21) Appl. No.: 17/623,519

(22) PCT Filed: Jun. 22, 2020

(86) PCT No.: PCT/FR2020/051082
§ 371 (c)(1),
(2) Date: Dec. 28, 2021

(87) PCT Pub. No.: WO2020/260815
PCT Pub. Date: Dec. 30, 2020

(65) Prior Publication Data
US 2022/0360135 A1    Nov. 10, 2022

(30) Foreign Application Priority Data
Jun. 28, 2019    (FR) ........................................ 1907101

(51) Int. Cl.
*H02K 5/24* (2006.01)
*B60H 1/00* (2006.01)
(Continued)

(52) U.S. Cl.
CPC ........... *H02K 5/24* (2013.01); *B60H 1/00471* (2013.01); *B60H 1/00521* (2013.01);
(Continued)

(58) Field of Classification Search
CPC ........ H02K 5/24; H02K 7/14; H02K 2213/03; H02K 5/00; B60H 1/00471;
(Continued)

(56) References Cited

U.S. PATENT DOCUMENTS 5,696,360 A    12/1997 Tiemeyer
6,028,379 A *    2/2000 Bertolini .................. H02K 5/24
310/91
(Continued)

FOREIGN PATENT DOCUMENTS

| FR | 3047125 A1 | 7/2017 | |
|---|---|---|---|
| FR | 3050490 A1 * | 10/2017 | ......... F04D 25/0613 |
| FR | 3053287 A1 * | 1/2018 | ........... F04D 29/601 |

OTHER PUBLICATIONS

International Search Report and Written Opinion issued in corresponding International Patent Application No. PCT/FR2020/051082, mailed on Oct. 14, 2020 (11 pages).

*Primary Examiner* — Dominick L Plakkoottam
(74) *Attorney, Agent, or Firm* — Osha Bergman Watanabe & Burton LLP

(57) ABSTRACT

The motor support (16) for a motor-fan unit of a ventilation installation for a vehicle comprises: two coaxial rings (20; 22), including an inner ring (20) capable of receiving one or more elements of the motor and an outer ring (22) capable of fixing fastened to a housing forming a structural element, a decoupling element (24) between the two coaxial rings (20; 22); and a means (44) for limiting the relative movement of one of the two rings (20; 22) relative to the other, in a plane normal to the common axis (A) of the two rings (20; 22), comprising at least one radial abutment (44)
(Continued)

fastened to one of the two rings (20; 22), with a radial clearance between the radial abutment (44) and the other of the two rings (20; 22).

12 Claims, 6 Drawing Sheets

(51) Int. Cl.
*F04D 25/06* (2006.01)
*F04D 25/08* (2006.01)
*F04D 29/66* (2006.01)
*H02K 7/14* (2006.01)

(52) U.S. Cl.
CPC ............. *F04D 25/06* (2013.01); *F04D 25/08* (2013.01); *F04D 29/668* (2013.01); *H02K 7/14* (2013.01); *B60H 2001/006* (2013.01)

(58) Field of Classification Search
CPC .......... B60H 1/00521; B60H 2001/006; B60H 1/00457; F04D 25/06; F04D 25/08; F04D 29/668

See application file for complete search history.

(56) References Cited

U.S. PATENT DOCUMENTS

| | | | |
|---|---|---|---|
| 9,660,498 B2 * | 5/2017 | Truillet | H02K 5/24 |
| 2008/0296985 A1 * | 12/2008 | Fukuno | H02K 1/187 |
| | | | 310/51 |
| 2013/0221786 A1 * | 8/2013 | Truillet | H02K 5/24 |
| | | | 310/91 |
| 2014/0314598 A1 * | 10/2014 | Le Goff | F04D 25/082 |
| | | | 417/423.8 |
| 2017/0033640 A1 * | 2/2017 | Le Goff | H02K 9/00 |
| 2018/0226857 A1 * | 8/2018 | Ishizaki | F04D 29/668 |

* cited by examiner

MOTOR SUPPORT FOR A HEATING, VENTILATION AND/OR AIR-CONDITIONING DEVICE FOR A MOTOR VEHICLE

TECHNICAL FIELD

The present invention relates to the field of heating, ventilation and/or air-conditioning devices for motor vehicles. The invention relates more particularly to an electric-motor support for such a device.

PRIOR ART

Motor vehicles are currently equipped with a heating, ventilation and/or air-conditioning device able to generate an air flow. Such a device is also able to manage the temperature and distribution within the vehicle interior of the air flow created. Such a heating, ventilation and/or air-conditioning device comprises, inter alia, a fan comprising a fan impeller rotationally driven by an electric motor. The electric motor is notably an electronically switched electric motor, controlled by a power supply module.

An electronically switched electric motor, or brushless direct current motor, comprises a rotor and stator assembly, each of these components bearing electromagnetic elements whose interaction generates the movement of the rotor in relation to the stator and, ultimately, the movement of the fan impeller.

The electric motor is assembled in the heating, ventilation and/or air-conditioning device via a motor support which comprises an inner ring configured to accept the stator of the electric motor, and an outer ring able to be fixed, directly or indirectly, to a structural element of the vehicle.

A decoupling element is interposed between the inner ring and the outer ring. This decoupling element is intended to limit, or even to prevent, the transmission of vibrations and/or stresses generated by the rotation of the electric motor, from the inner ring to the outer ring. This then limits the transmission, to the heating, ventilation and/or air-conditioning device, of vibrations that could be felt by the occupants of the vehicle.

The decoupling element allows relative movement of the inner ring with respect to the outer ring, notably in a plane normal to an axis common to the two rings. In the absence of the decoupling element, vibrations may spread through the vehicle interior and have an adverse effect on the comfort of the occupants. The decoupling element additionally needs to be able to withstand the mechanical stresses resulting from movements of one ring with respect to the other.

The object of the present invention is to propose a motor support, notably for a motor vehicle heating, ventilation and/or air-conditioning device, that is simple to produce and that does not exhibit at least some of the disadvantages of the known motor supports.

SUMMARY

To this end, one subject of the invention is a motor support, notably for a motor-fan unit of a vehicle ventilation installation, comprising:
two coaxial rings, these being an inner ring able to accept one or more elements of the motor and an outer ring able to be fixed to a housing that forms a structural element,
a decoupling element for decoupling the two coaxial rings, and
a means for limiting the relative movement of one of the two rings with respect to the other, in a plane normal to the common axis of the two rings, and comprising at least one radial end-stop fixed to one of the two rings with a radial clearance between the end-stop and the other of the two rings.

Thus, the radial end-stop is able to limit the relative movement of one of the two rings with respect to the other in the midplane of the motor support, normal to the axis common to the two rings. Maintaining a radial clearance between the radial end-stop and one of the rings also allows the decoupling element to perform its function satisfactorily.

As a preference, the motor support comprises one or more of the following features, considered alone or in combination:
the at least one radial end-stop extends between the inner ring and the outer ring, the at least one radial end-stop preferably having an interior curvature that compliments the curvature of the inner ring and/or an exterior curvature that compliments the curvature of the outer ring;
the motor support comprises at least two radial end-stops that are opposite one another with respect to the center of the rings, preferably at least three radial end-stops evenly angularly distributed about the common axis of the two rings;
the motor support further comprises:
a means for limiting, preferably preventing, the relative rotation of the rings about the common axis of the two rings, and/or
a tilt-limiting element limiting the tilting of the inner ring with respect to the outer ring, the tilt-limiting element comprising a finger projecting from a first of the two rings and housed in a receptacle formed in the second of the two rings, two axial end-stops being formed in the receptacle to limit the movement of the finger in the receptacle in the direction of the common axis of the two rings;
the motor support comprises a means for limiting the relative rotation of the rings and a tilt-limiting element, wherein the means for limiting, preferably preventing, the relative rotation of the rings about the common axis of the two rings comprises two orthoradial end-stops in the receptacle that limit, preferably prevent, orthoradial movement of the finger in the receptacle;
one of the axial end-stops is formed by a spigot extending into the receptacle from a base of a peg which is fixed to the second of the two rings;
the peg also forms the two orthoradial end-stops, the two orthoradial end-stops preferably extending on either side of the axial end-stop, the two orthoradial end-stops and the axial end-stop forming a U-shaped relief from the base of the peg;
the base of the peg has a blind hole in line with the spigot, the base of the peg having a substantially constant width in the vicinity of the hole and/or ribs in the vicinity of the hole, the ribs preferably extending radially from the hole toward a rim of the base;
the at least one radial end-stop is formed by the peg, the peg preferably forming two radial end-stops positioned on either side of the receptacle, in an orthoradial direction;
the at least one radial end-stop is fixed to the outer ring;
the inner ring and/or the outer ring is covered with an elastomeric material, at least facing the at least one radial end-stop;
the radial clearance is substantially 1 mm;

the decoupling element comprises an elastomeric ring overmolded between the inner ring and the outer ring;

the elastomeric ring covers the inner ring and/or the outer ring at least facing the at least one radial end-stop;

at least one of the axial end-stops projects into the receptacle;

elastomeric material is arranged between the finger and each of the two axial end-stops and in contact with the finger and one of the two axial end-stops, the elastomeric material preferably being compressed between the finger and each of the two axial end-stops, the elastomeric material more preferably still having a compression ratio greater than or equal to 5% and/or less than or equal to 25%, more preferably still, substantially equal to 15%;

the motor support comprises the one same thickness of elastomer between the finger and each of the two axial end-stops;

the at least one axial end-stop extends in a direction substantially perpendicular to the direction of elongation of the finger;

the motor support comprises two axial end-stops projecting into the receptacle and positioned one on each side of the finger, the two projecting axial end-stops facing one another;

the elastomeric material is overmolded onto two opposite faces of the finger;

the elastomeric material has a hardness of between 40 and 60 Shore;

the elastomeric material in contact with the finger and each of the two end-stops is formed as one with the elastomeric ring;

the finger has an H-shaped cross section; and the two opposite faces of the finger that face the axial end-stops are planar.

Another aspect of the invention describes a fan, particularly for a ventilation installation for a vehicle, comprising an electric motor, particularly a brushless electric motor, a fan impeller, rotationally driven by the electric motor, and a motor support as described hereinabove in all its combinations, the motor, particularly the stator of the motor, being fixed to the inner ring of the motor support.

Yet another aspect of the invention describes a heating, ventilation and/or air-conditioning device for a motor vehicle, comprising a fan as described hereinabove in all its combinations.

BRIEF DESCRIPTION OF THE DRAWINGS

Further features, details and advantages will become more clearly apparent from reading the description given below by way of illustration and with reference to the following figures.

DETAILED DESCRIPTION

Figure 1:
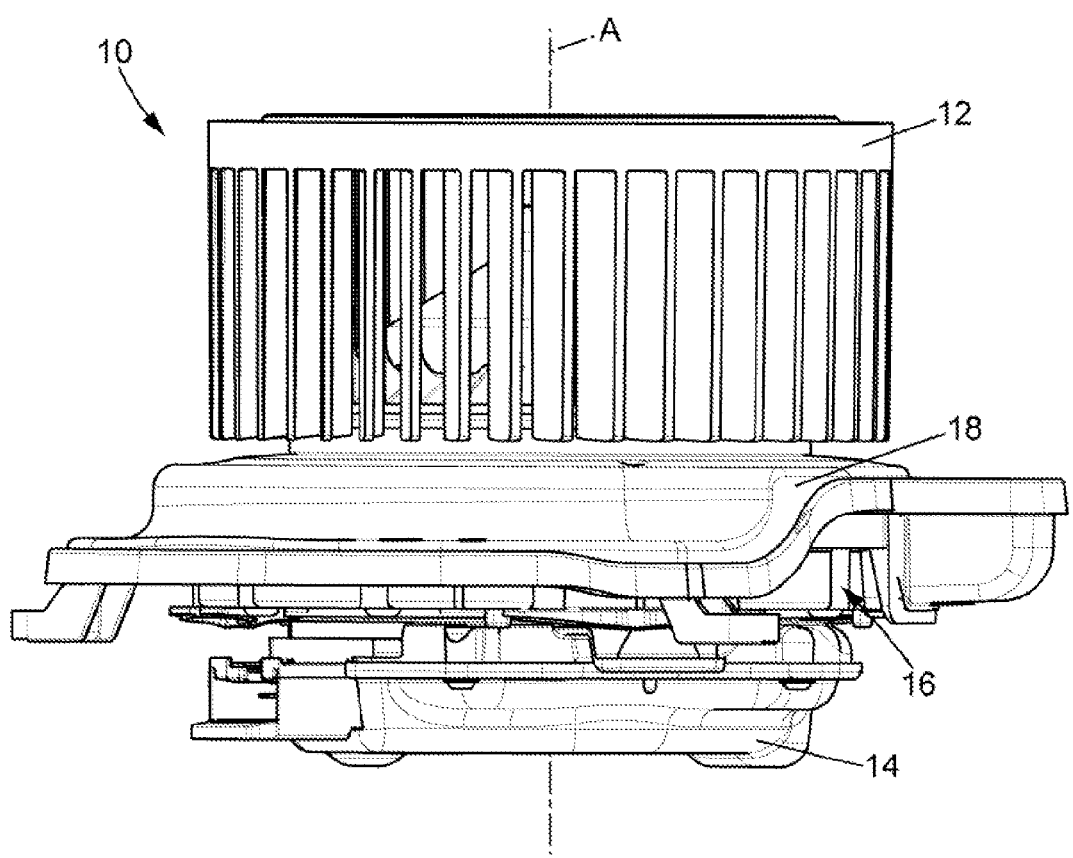
FIG. 1 is a schematic side view of one example of a fan device for a heating, ventilation and/or air-conditioning device for a motor vehicle.

FIG. 1 schematically illustrates a side view of a fan device 10 for a heating, ventilation and/or air-conditioning device for a motor vehicle. In the conventional way, such a heating, ventilation and/or air-conditioning device for a motor vehicle comprises a ventilation circuit, a fan device 10 for causing the air to move in the ventilation circuit, and means for heating and/or means for cooling the flow of air set in motion by the fan device 10.

As illustrated in FIG. 1, the fan device 10 essentially comprises a fan impeller 12 and an electric motor, here hidden by a motor cowl 14, for driving the rotation of the fan impeller 12 about its axis A. The electric motor is, for example, a brushless motor. The fan device 10 further comprises a motor support 16 allowing the electric motor to be assembled on a support. In this particular instance, the electric motor is connected to a deflector 18 of the motor support 16, the deflector 18 forming part of the ventilation circuit of the heating, ventilation and/or air-conditioning device.

The motor support 16 is described in greater detail in what follows.

As visible in the figures, the motor support 16 essentially comprises an inner ring 20, an outer ring 22 and a decoupling element 24 interposed between the inner ring 20 and the outer ring 22. The decoupling element 24 is aimed at limiting the transmission of vibrations from one of the two rings 20, 22 to the other of the two rings 20, 22. The decoupling element 24 is formed here by an elastomeric ring. By way of example, the elastomeric material is SEBS (polystyrene-b-poly(ethylene-butylene)-b-polystyrene). The decoupling ring 24 is, for example, overmolded on the inner ring 20 and outer ring 22. The decoupling ring 24 thus secures together the inner ring 20 and outer ring 22. The inner ring 20, outer ring 22 and decoupling ring 24 are coaxial, having, as common axis, the axis of rotation A of the fan impeller 12.

The assembly formed by the inner ring 20, outer ring 22 and decoupling ring 24 is housed in a cavity of the deflector 18. The inner ring 20 is secured to the stator (not visible here) of the motor. The outer ring 22 is fixed here to the deflector 18. A layer of elastomeric material may be interposed between the outer ring 22 and the deflector 18.

According to the example depicted in the figures, the inner ring 20 has a plurality of fingers 26. The fingers 26 extend radially outward, from the exterior surface of the inner ring 20. In this particular instance, each finger 26 has an H-shaped cross section, comprising two substantially planar surfaces 261, 262 connected to one another by a web 263. Here, the planar surfaces 261, 262 are normal to the direction of the axis A common to the rings 20, 22, 24. Here, each planar surface 261, 262 is covered with a layer $27_1$, $27_2$ of elastomeric material.

In the example illustrated, the inner ring 20 has three fingers 26. The fingers 26 are preferably uniformly angularly distributed about the axis A of the inner ring 20.

The outer ring 22 for its part comprises a plurality of receptacles 28. Each receptacle 28 is designed to accept a respective finger 26. The receptacles 28 thus open at least onto the radially internal surface of the outer ring 22. In this particular instance, the receptacles 28 pass all the way through, opening onto the radially internal surface of the outer ring 22 and onto the radially external surface of the outer ring 22. The receptacles 28 are preferably uniformly angularly distributed about the axis A of the outer ring 22.

The housing of the fingers 26 in the receptacles 28 makes it possible to limit the capacity for relative tilting of the inner ring 20 with respect to the outer ring 22. What is meant here by tilting is any movement of one of the rings 20, 22 with respect to the other 20, 22 outside of the common midplane of the rings 20, 22, normal to the direction of the axis A common to the two rings 20, 22.

Figure 2:
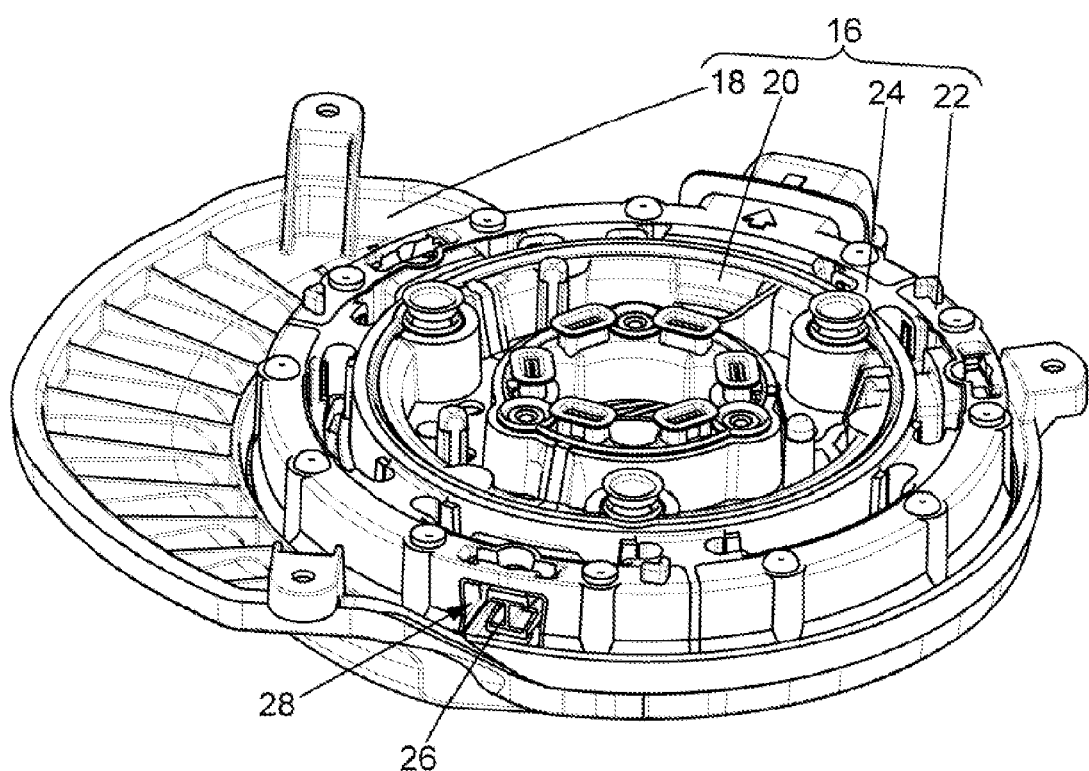
FIG. 2 is a schematic perspective view of an assembly formed by the motor support and a housing of the fan device of FIG. 1.

In the example illustrated, the receptacles 28 have dimensions such that there is clearance between the walls of each receptacle 28 and the finger 26 housed therein (cf. particularly FIG. 2). In particular, there is clearance in the orthoradial direction. The walls of each receptacle 28 may be covered with elastomeric material. As a preference, the layer of elastomer 30 that covers the walls of each receptacle 28 is formed as one with the decoupling ring 24.

Figure 4:
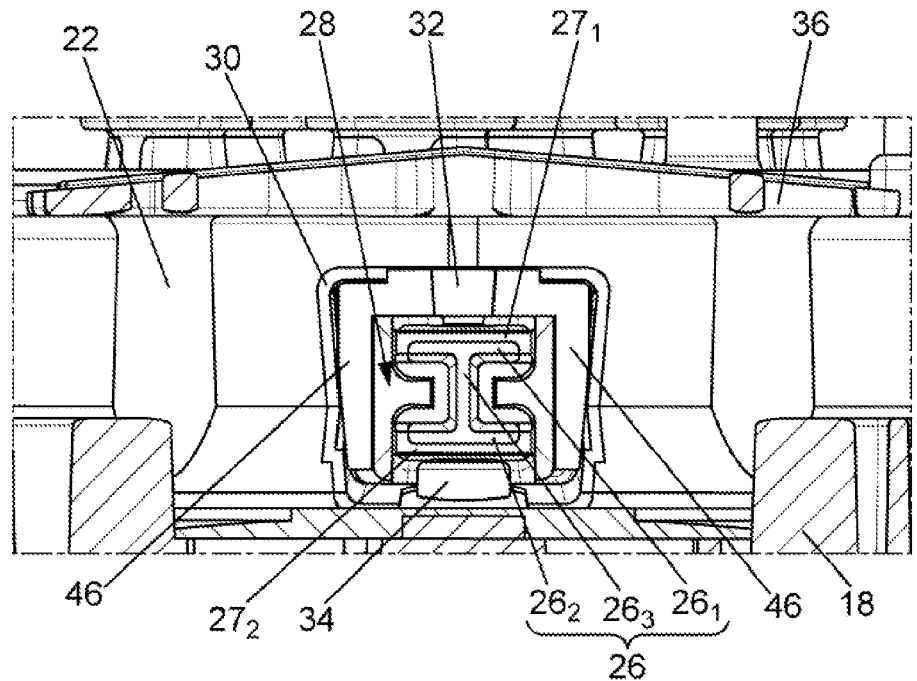
FIG. 4 is a schematic side view of a detail of the sub-assembly of FIG. 3.

As is more particularly visible in FIG. 4, in each receptacle 28, the finger 26 collaborates with two axial end-stops 32, 34 to further limit the axial movement of the finger 26 in the receptacle 28. Here, the two axial end-stops 32, 34 project from the walls of the receptacle 28. What is meant here by an axial end-stop is an end-stop that limits movement in the direction of the common axis A of the rings 20, 22, 24.

In the example illustrated, a clearance is maintained between the elastomeric material of a layer $27_1$, $27_2$ covering one of the planar surfaces $26_1$, $26_2$ of the finger 26, and the axial end-stops 32, 34. As an alternative, however, the layers $27_1$, $27_2$ of elastomeric material may be in contact with, or even compressed between, the planar surfaces $26_1$, $26_2$ of the finger, and the axial end-stops 32, 34. This then limits the capacity for movement of the finger 26 in the receptacle 28 in the axial direction A. For example, the elastomeric material of the layers $27_1$, $27_2$ present between the axial end-stops 32, 34 and the planar surfaces $26_1$, $26_2$ has an axial compression ratio greater than or equal to 5% and/or less than or equal to 25%, preferably substantially equal to 15%. The axial compression ratio may be defined as being the ratio between:

the difference between, on the one hand, the thickness of the layer of elastomer $27_1$, $27_2$ on the planar surfaces $26_1$, $26_2$ of the fingers 26 before the fingers 26 are placed between the axial end-stops 32, 34, and, on the other hand, the thickness of the layer of elastomer $27_1$, $27_2$ on the planar surfaces $26_1$, $26_2$ of the fingers 26 after the fingers 26 have been placed between the axial end-stops 32, 34; and the thickness of the layer of elastomer on the planar surfaces $26_1$, $26_2$ of the fingers 26 before the fingers 26 are placed between the axial end-stops 32, 34.

Also in order to achieve this, the elastomeric material of which the layers $27_1$, $27_2$ are formed may be chosen according to its hardness. This elastomeric material may notably have a hardness greater than or equal to 40 Shore and/or less than or equal to 60 Shore.

The elastomeric material of the layers $27_1$, $27_2$ may advantageously be overmolded on the surfaces $26_1$, $26_2$ of the fingers 26, particularly at the same time as the overmolding of the decoupling ring 24. The elastomeric material is thus held in position with respect to the fingers 26. This then also makes the inner ring 20 easier to mount with respect to the outer ring 22.

The first axial end-stop is formed here by a spigot 32 of a peg 36. The peg 36 also comprises a substantially planar base 38 from which the spigot 32 extends along an axis B intended to be parallel to the common axis A of the rings 20, 22, 24 when the peg 36 is fixed on the outer ring 22. To provide this fixing, the base 38 here has two openings 40 which are intended to be mounted tightly on two complementary cylindrical reliefs formed on the outer ring 22. Furthermore, two notches 42 are provided at the longitudinal ends of the base 38. One of the two notches 42 accepts a complementary rib formed by the outer ring 22, to guide the mounting of the peg 36 on the outer ring 22. The spigot 32 is mounted in a hole in the outer ring 22 so as to project into a receptacle 28 and thus form the first axial end-stop 32. More specifically, the spigot 32 extends in the direction of the common axis A of the rings 20, 22, 24, from one of the walls of the receptacle 28, toward the finger 26 housed therein.

The second axial end-stop 34 is here formed by the deflector 18 which comprises projecting cylindrical reliefs passing through an opening in the outer ring 22 so as to project into the receptacles 28 from an opposite wall to the first axial end-stop 32. The projecting cylinders also extend in a direction parallel to the direction of the axis A common to the rings 20, 22, 24.

Figure 3:
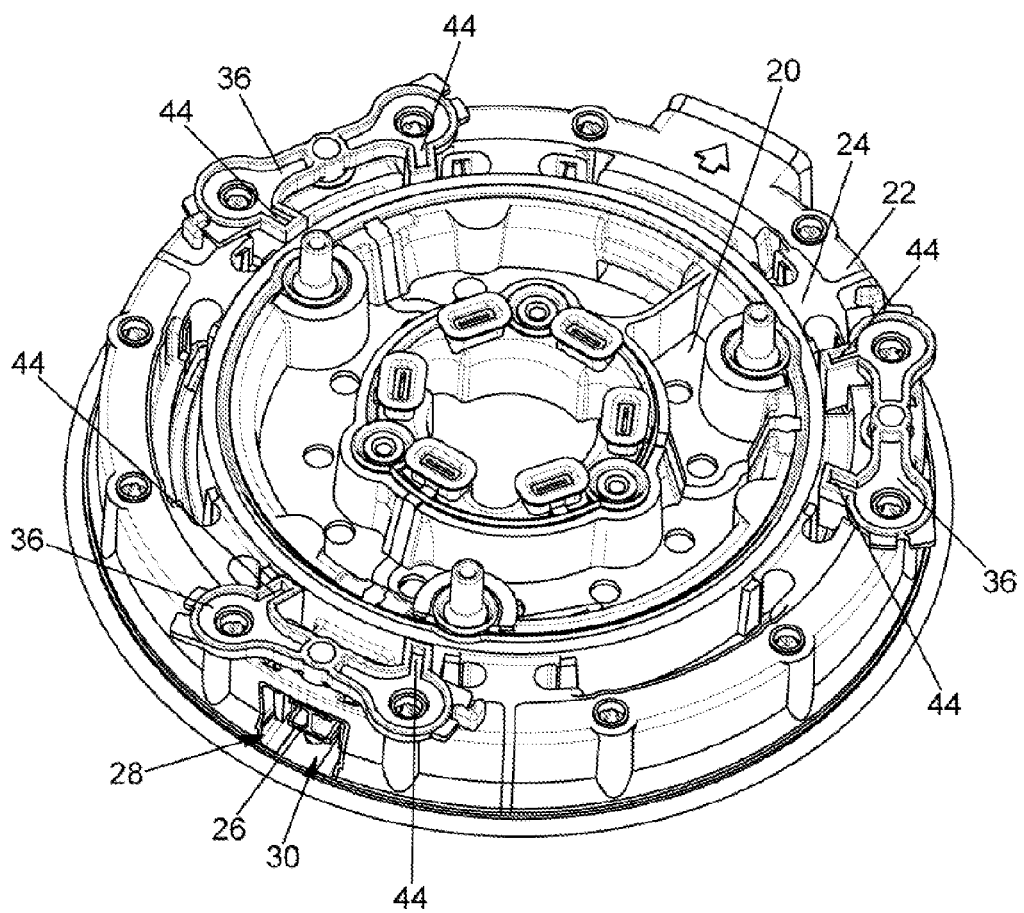
FIG. 3 is a schematic perspective view of a sub-assembly of the motor support of FIG. 2.
Figure 5:
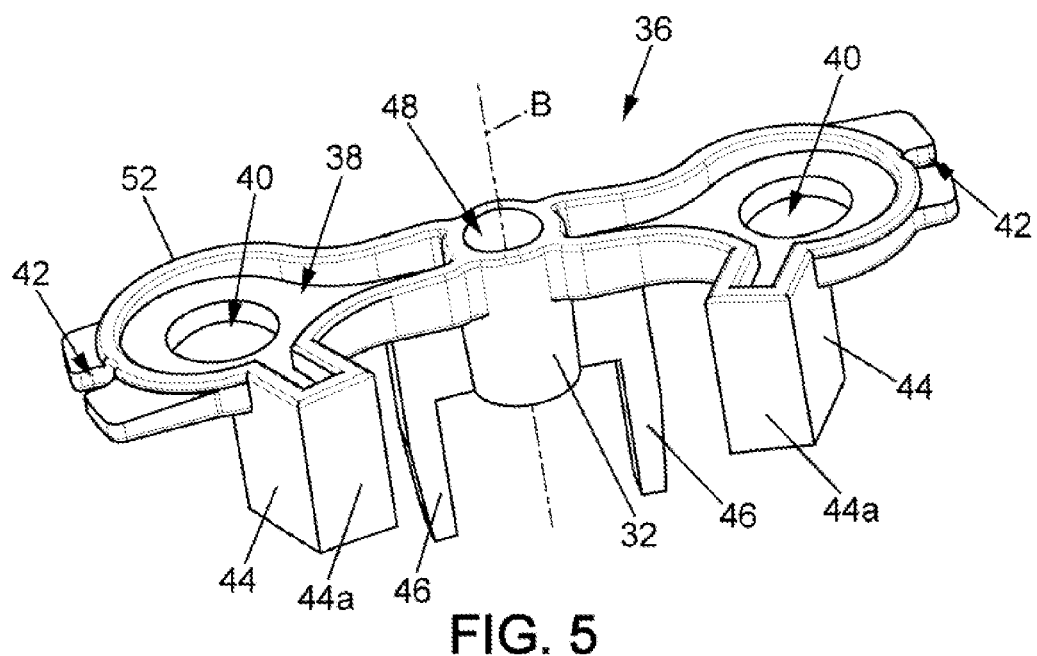
FIG. 5 is a schematic perspective view of an example of a peg used in the motor support of FIGS. 2 and 3.
Figure 6:
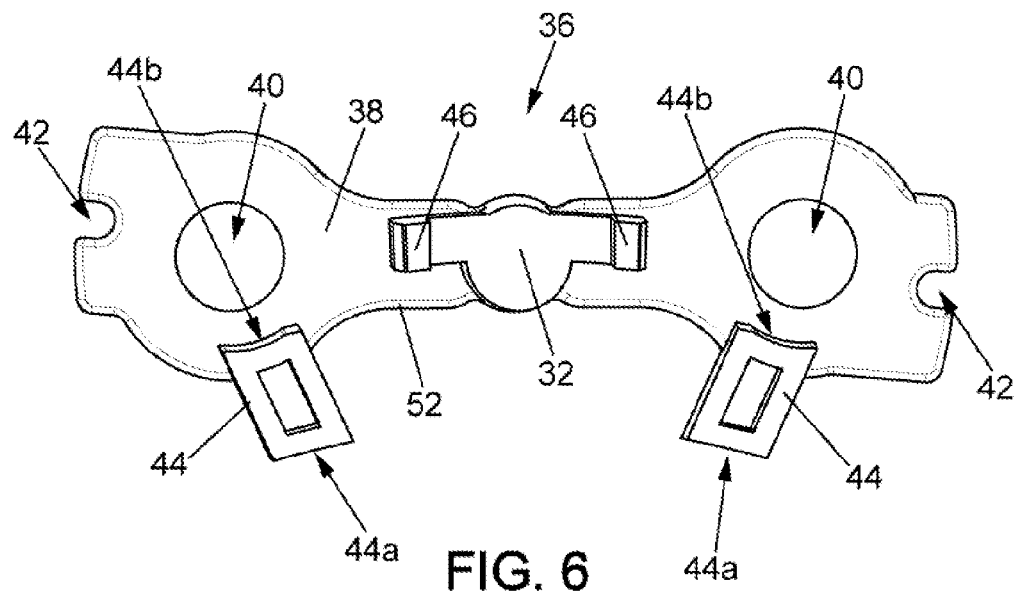
FIG. 6 is a schematic view from beneath of the peg of FIG. 5.

Furthermore, as is more particularly visible in FIGS. 5 and 6, each peg 36 here has two reliefs 44 which are symmetrical with respect to a midplane of the peg 36, containing the axis B. Each relief 44 is intended to extend, from the base 38, substantially in a radial direction, with respect to the common axis A of the rings 20, 22, 24 when the peg 36 is fixed on the outer ring 22. Thus, as is notably visible in FIG. 3, each relief 44 is housed in a recess formed in the decoupling ring 24, between the inner ring 20 and the outer ring 22.

Each relief 44 fixed to the outer ring 22 here forms a radial end-stop for the movement of the inner ring 20 with respect to the outer ring 22. Thus, the reliefs 44 limit the relative movements of the inner ring 20 with respect to the outer ring 22, in a radial direction. This limiting of the amplitude of the movement of the inner ring 20 with respect to the outer ring 22 makes it possible to avoid damaging the decoupling element 24, for example if the fan 10 is knocked. These knocks may, for example, result from unevenness of the terrain over which the vehicle is used.

Each relief 44 has a substantially cylindrical shape of axis parallel to the axis B of the spigot of the peg 32, the transverse section of each relief 44 here being substantially in the shape of a parallelogram. The interior frontal surface 44a of each relief 44, which surface is intended to be oriented in a substantially radial direction when the peg 36 is fixed to the outer ring 22, is curved, in this instance concave. The curvature of the frontal surface 44a advantageously compliments the exterior curvature of the inner ring 20, possibly covered with the polymer material of the decoupling ring 24. Thus, a substantially constant radial clearance is maintained between the entire interior frontal surface 44a of the relief 44 and the inner ring 20, possibly covered with a layer of the elastomeric material of the decoupling ring 24. This radial clearance is, for example, equal to 1 mm. Maintaining a radial clearance between the end-stops 44 and the inner ring 20 allows satisfactory decoupling by the decoupling ring. In other words, decoupling is provided for small-amplitude movements, and the radial end-stops are able to ensure the reliability of the decoupling element 24 when highly stressed.

The exterior frontal surface 44b of each relief 44, which surface is intended to be oriented in a substantially radial direction, toward the outer ring 22 when the peg 36 is fixed to the outer ring 22, is curved, in this instance concave. The curvature of the exterior frontal surface 44b advantageously compliments the interior curvature of the outer ring 22, possibly covered with the polymer material of the decoupling ring 24. In this particular instance, the outer ring 22 has local convexity. The curvature of the exterior frontal surface 44b allows each peg 36, fixed to the outer ring 22, to be positioned and then held in position, more easily.

Furthermore, the motor support 16 here comprises a means for limiting, preferably preventing, the relative rotation of the inner and outer rings 20, 22. This means here takes the form of orthoradial end-stops 46 in at least one receptacle 28, preferably in each receptacle 28. The orthoradial end-stops 46 are designed to collaborate with a finger 26 housed in the receptacle 28.

In this particular instance, the orthoradial end-stops 46 are formed by the pegs 36. More specifically, each peg 36 in the example illustrated has a pair of projecting reliefs 46 (or teeth 46) extending on either side of the spigot 32 forming the axial end-stop, in the direction of the axis B of extension of the spigot 32. The spigot 32 and the teeth 46 thus form a U-shaped relief from the base of the peg 36.

To make the pegs 36 easier to mold, their base 38 may have a blind hole 48 in line with the spigot 32. This then limits the quantity of plastic that has to be molded at this spigot. For the same reason, the base 38 may in the region of this hole 48 have a width that is reduced by comparison with the width at its ends.

Figure 7:
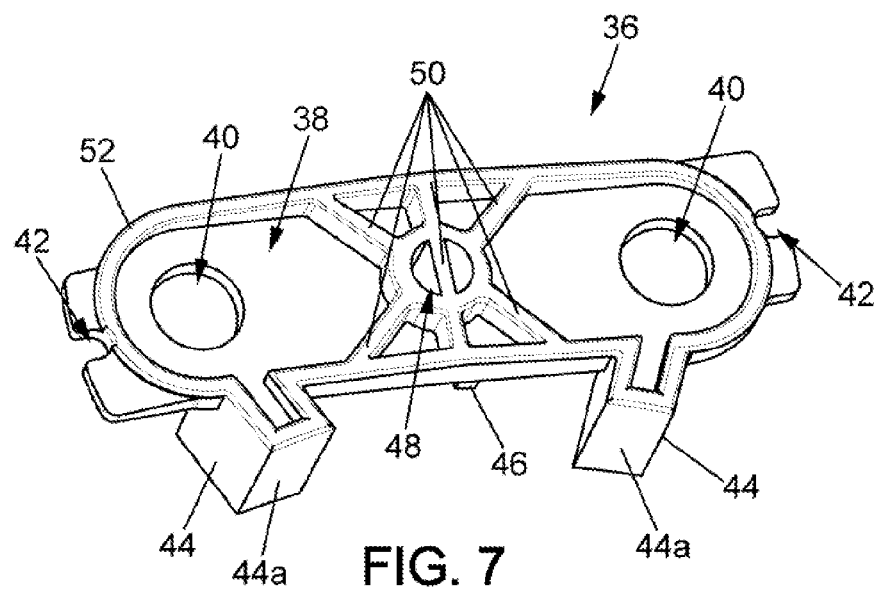
FIG. 7 is a schematic perspective view of a second example of a peg used in the motor support of FIGS. 2 and 3.
Figure 8:
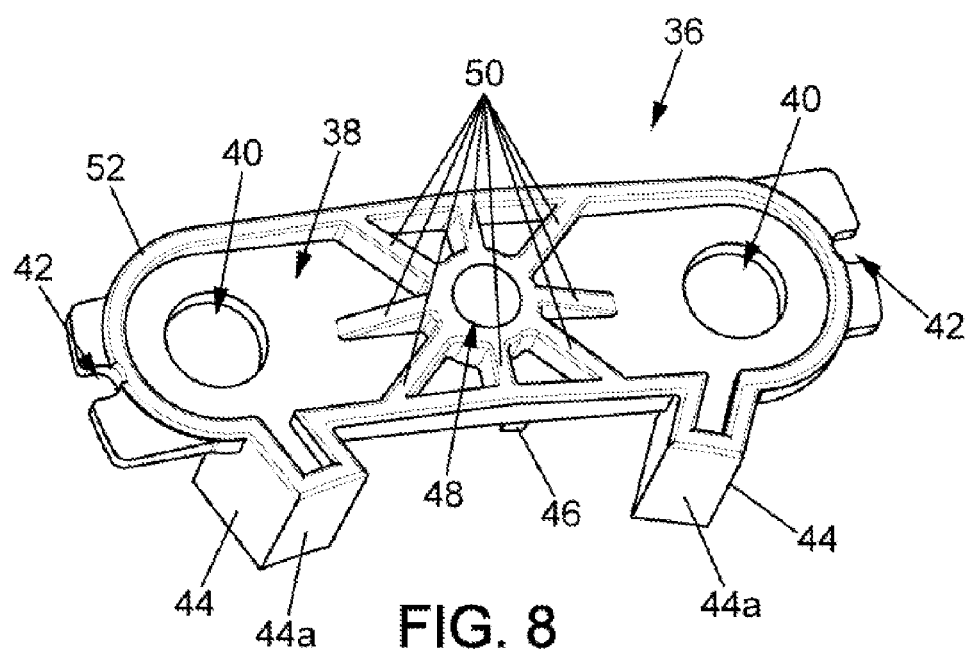
FIG. 8 is a schematic perspective view of a third example of a peg used in the motor support of FIGS. 2 and 3.

FIGS. 7 and 8 illustrate variants of the peg 36 of FIGS. 5 and 6. Specifically, in order to strengthen the pegs 36 and limit or even avoid the appearance of cracks at the hole 48, the base 38 of the pegs 36 of FIGS. 7 and 8 has reinforcing ribs 50, in the vicinity of the hole 48, or even across the hole 48 (cf. FIG. 7). These ribs 50 may extend radially from the edge of the hole 48, for example as far as a rim 52 of the base 38. It may also be noted that the base 38 of the examples of pegs 36 of FIGS. 7 and 8 has a width that is substantially constant, notably in the vicinity of the hole 48. The bases 38 in these two examples are thus substantially rectangular with rounded ends.

The present disclosure is not restricted to the examples described hereinabove but encompasses all variants and combinations conceivable to a person skilled in the art within the scope of the protection sought.

According to a first embodiment variant, one single axial end-stop projects into the receptacles 28. In that case, the finger housed in the receptacle may be clamped between, on the one hand, the projecting axial end-stop and, on the other hand, the opposite wall of the receptacle from the projecting axial end-stop.

Furthermore, the axial end-stops may be produced using means other than those described in the above example. For example, one and/or the other of the axial end-stops may be produced in the form of a boss on the wall of the receptacle, and extending toward the finger housed in the receptacle.

Furthermore, in the example illustrated, the elastomeric material is present on the faces of the fingers facing the axial end-stops. Alternatively or in addition, elastomeric material may be provided on the axial end-stops, whether or not these project. However, as a preference, contact between two layers of elastomeric material is avoided. Thus, as a preference, just one of the two contacting surfaces is covered with elastomeric material.

Also, in the example illustrated, the inner ring forms fingers housed in receptacles formed in the outer ring. However, the reverse configuration is conceivable, with the outer ring having fingers oriented radially toward the inner ring and housed in receptacles formed in this inner ring.

The orthoradial end-stops and/or the radial end-stops may also adopt forms other than those described here. Advantageously, however, the radial end-stop is fixed to one of the two, inner and outer, rings and extends between these two, inner and outer, rings, with a radial clearance.

The orthoradial end-stops may for example take the form of a boss on a wall of the receptacle housing a finger.

Likewise in the example illustrated, three pairs of radial end-stops are evenly distributed about the common axis of the two, inner and outer, rings. Of course, this number of radial end-stops is nonlimiting. The motor support may notably comprise two radial end-stops that are opposite one another with respect to the center of the inner and outer rings, or three or more radial end-stops, preferably evenly distributed about the common axis of the inner and outer rings.

The invention claimed is:

1. A motor support for a motor-fan unit of a vehicle ventilation installation, comprising:
   two coaxial rings including an inner ring able to accept one or more elements of the motor and an outer ring able to be fixed to a housing that forms a structural element;
   a decoupling element for decoupling the two coaxial rings;
   the decoupling element comprising an elastomeric ring overmolded between the inner ring and the outer ring;
   at least one radial end-stop that limits relative movement of one of the two rings with respect to the other, in a plane normal to a common axis of the two rings; and
   the at least one radial end-stop being fixed to one of the two rings with a radial clearance between the at least one radial end-stop and the other of the two rings.

2. The motor support as claimed in claim 1, wherein the at least one radial end-stop extends between the inner ring and the outer ring, the at least one radial end-stop having an interior curvature that compliments the curvature of the inner ring and/or an exterior curvature that compliments the curvature of the outer ring.

3. The motor support as claimed in claim 1, further comprising at least three radial end-stops evenly angularly distributed about the common axis of the two rings.

4. The motor support as claimed in claim 2, further comprising:
   a means for limiting or preventing the relative rotation of the two rings about the common axis of the two rings; and
   a tilt-limiting element limiting the tilting of the inner ring with respect to the outer ring, the tilt-limiting element comprising a finger projecting from a first of the two rings and housed in a receptacle formed in the second of the two rings, two axial end-stops being formed in the receptacle to limit the movement of the finger in the receptacle in the direction of the common axis of the two rings.

5. The motor support as claimed in claim 4, wherein the means for limiting or preventing the relative rotation of the rings about the common axis of the two rings comprises two orthoradial end-stops in the receptacle that limit or prevent orthoradial movement of the finger in the receptacle.

6. The motor support as claimed in claim 5, wherein one of the axial end-stops is formed by a spigot extending into the receptacle from a base of a peg which is fixed to the second of the two rings.

7. The motor support as claimed in claim 6, wherein the peg also forms the two orthoradial end-stops, the two orthoradial end-stops extending on either side of the axial end-stop, the two orthoradial end-stops and the axial end-stop forming a U-shaped relief from the base of the peg.

8. The motor support as claimed in claim 6, wherein the base of the peg has a blind hole in line with the spigot, the base of the peg having a substantially constant width in the vicinity of the hole and/or ribs in the vicinity of the hole, the ribs extending radially from the hole toward a rim of the base.

9. The motor support as claimed in claim 6, wherein the at least one radial end-stop is formed by the peg, the peg forming two radial end-stops positioned on either side of the receptacle, in an orthoradial direction.

10. The motor support as claimed in claim 1, wherein the at least one radial end-stop is fixed to the outer ring.

11. A fan for a ventilation installation for a vehicle, comprising:
   a brushless electric motor;
   a fan impeller, rotationally driven by the electric motor; and
   a motor support as claimed in claim 1, wherein a stator of the motor is fixed to the inner ring of the motor support.

12. A motor support for a motor-fan unit of a vehicle ventilation installation, comprising:
   two coaxial rings including an inner ring able to accept one or more elements of the motor and an outer ring able to be fixed to a housing that forms a structural element;
   a decoupling element for decoupling the two coaxial rings;
   the decoupling element comprising an elastomeric ring overmolded between the inner ring and the outer ring;
   at least one radial end-stop that limits relative movement of one of the two rings with respect to the other, in a plane normal to a common axis of the two rings;
   the at least one radial end-stop being fixed to one of the two rings with a radial clearance between the at least one radial end-stop and the other of the two rings,
   wherein the at least one radial end-stop extends between the inner ring and the outer ring, the at least one radial end-stop having an interior curvature that compliments the curvature of the inner ring and/or an exterior curvature that compliments the curvature of the outer ring;
   a means for limiting or preventing the relative rotation of the two rings about the common axis of the two rings; and
   a tilt-limiting element limiting the tilting of the inner ring with respect to the outer ring, the tilt-limiting element comprising a finger projecting from a first of the two rings and housed in a receptacle formed in the second of the two rings, two axial end-stops being formed in the receptacle to limit the movement of the finger in the receptacle in the direction of the common axis of the two rings.

\* \* \* \* \*